US012489845B1

(12) United States Patent
Dizengof et al.

(10) Patent No.: US 12,489,845 B1
(45) Date of Patent: Dec. 2, 2025

(54) AUTONOMOUS PUBLIC SAFETY ANSWERING POINT (PSAP)

(71) Applicant: Carbyne Ltd., Tel-Aviv (IL)

(72) Inventors: Alexander Dizengof, New York, NY (US); Joseph Emerson Berger, Jr., New York, NY (US)

(73) Assignee: Carbyne Ltd., Tel-Aviv (IL)

( * ) Notice: Subject to any disclaimer, the term of this patent is extended or adjusted under 35 U.S.C. 154(b) by 0 days.

(21) Appl. No.: 19/241,590

(22) Filed: Jun. 18, 2025

(51) Int. Cl.
*H04W 4/90* (2018.01)
*G06Q 50/26* (2012.01)
*H04M 3/51* (2006.01)

(52) U.S. Cl.
CPC ........ *H04M 3/5116* (2013.01); *G06Q 50/265* (2013.01); *H04W 4/90* (2018.02)

(58) Field of Classification Search
CPC ....... H04W 4/02; H04W 4/021; H04W 4/025; H04W 4/29; H04W 4/90; H04M 3/5116; G06Q 50/265
USPC ...................................................... 455/404.1
See application file for complete search history.

(56) References Cited

U.S. PATENT DOCUMENTS

| | | | |
|---|---|---|---|
| 10,715,662 | B2 | 7/2020 | Bondareva et al. |
| 11,395,124 | B2 | 7/2022 | Rohde et al. |
| 11,558,507 | B1 * | 1/2023 | Anderson ......... H04M 3/42195 |
| 11,889,398 | B2 | 1/2024 | Rohde et al. |
| 12,271,848 | B2 | 4/2025 | Veloso et al. |
| 12,288,459 | B1 * | 4/2025 | Lewy ................... H04W 76/50 |
| 2005/0208925 | A1 * | 9/2005 | Panasik ............ H04M 1/72421 455/404.1 |
| 2014/0194082 | A1 * | 7/2014 | Wingert ........... H04M 3/42221 455/404.1 |
| 2014/0368601 | A1 * | 12/2014 | deCharms ............. H04N 7/148 348/14.02 |
| 2017/0176198 | A1 * | 6/2017 | Tatourian .......... G01C 21/3453 |
| 2019/0174289 | A1 * | 6/2019 | Martin ................ H04M 3/5141 |

(Continued)

OTHER PUBLICATIONS

Blomberg et al. "Machine Learning as A Supportive Tool to Recognize Cardiac Arrest in Emergency Calls", Resuscitation, 138: 322-329, Published Online Jan. 18, 2019.

(Continued)

*Primary Examiner* — Jean A Gelin

(57) ABSTRACT

A method, apparatus, and computer program product for autonomous public safety answering point (PSAP). Responsive to receiving emergency call(s) originating from client device(s) used to report emergency event(s), one or more artificial intelligence (AI) agents are initiated for handling the emergency call(s), the agent(s) being configured to: classify the emergency event(s) into event type(s) associated with response protocol(s) according to data extracted from the emergency call(s); initiate emergency event report interaction(s) via the client device(s) for prompting reply to query(s) relating to the emergency event(s) driven by the response protocol(s); determine event attribute(s) of the emergency event(s) according to data extracted from the reply received to the query(s); populate entry(s) of emergency event record(s) for computer aided dispatch (CAD) of responder units to emergency events; and responsive to a determination to dispatch responder unit(s) to address the emergency event(s), dispatch the responder unit(s) according to the emergency event record(s).

20 Claims, 4 Drawing Sheets

(56) References Cited

U.S. PATENT DOCUMENTS

| | | | | |
|---|---|---|---|---|
| 2020/0244797 | A1* | 7/2020 | Horelik | H04L 63/0407 |
| 2023/0137028 | A1* | 5/2023 | Anderson | H04M 3/42357 |
| | | | | 379/45 |
| 2023/0188968 | A1* | 6/2023 | Sheth | H04W 4/90 |
| | | | | 455/404.1 |
| 2023/0288968 | A1* | 9/2023 | Koo | G06F 1/185 |
| 2024/0022663 | A1* | 1/2024 | Kolaxis | H04M 3/5183 |
| 2025/0071205 | A1* | 2/2025 | Dizengof | H04M 3/42348 |
| 2025/0133383 | A1* | 4/2025 | Gaito | H04W 4/38 |
| 2025/0140101 | A1* | 5/2025 | Fucci | G08B 27/001 |
| 2025/0218275 | A1* | 7/2025 | Katt | H04W 76/50 |

OTHER PUBLICATIONS

Carbyne "AI-V Emergency Call Triage: the Pulse of 9-1-1: What 2025 Tells Us About the Future of 9-1-1", Carbyne New Orleans, 7 P., Jun. 15, 2023.

EENA "AI in Public Safety: The Future for Emergency Services?", EENA (European Emergency No. Association) Blog, 5 P., Sep. 28, 2023.

EENA "Artificial Intelligence", EENA ASBL, Press Release, 8 P., 2018.

Emani et al. "Enhancing Emergency Response Through Artificial Intelligence in Emergency Medical Services Dispatching; A Letter to Editor", Archives of Academic Emergency Medicine, 22(1): e60-1-e60-2, Published Online Aug. 22, 2023.

GovTech Biz "Can Gov Tech I Ielp Solve the 911 Nuisance Call Problem?", Government Technology GovTech Biz, News, 4 P., Aug. 28, 2024.

Mocanu et al. "ODIN IVR: Interactive Solution for Emergency Calls", Applied Sciences, 12(21): 10844-1-10844-19, Oct. 26, 2022.

Motorola Solutions "The Future of Artificial Intelligence in the PSAP: What It Means and How to Prepare", Motorola Solutions, Whitepaper, 6 P., 2018.

RapidSOS "RapidSOS Introduces Harmony—The First AI Copilot for 911", RapidSOS, 5 P., May 21, 2024.

Versaterm "Versaterm CallTriage Addresses High Non-Emergency Call vols. Staffing Shortages Using Conversational AI", Globe Newswire, 6 P., Aug. 22, 2024.

Winbourne "Chatbot 9-1-1", APCO International, Public Safety Communications Magazine, 5 P., Dec. 1, 2023.

Wood "New Orleans 911 Is Triaging Emergency Calls With AI", StateScoop, 10 P., Jul. 5, 2024.

* cited by examiner

AUTONOMOUS PUBLIC SAFETY ANSWERING POINT (PSAP)

BACKGROUND

Some embodiments described in the present disclosure relate to automated emergency services and, more specifically, but not exclusively, to systems and methods for autonomous emergency call handling and dispatch, and in particular, to an artificial intelligence (AI) agent-driven autonomous Public Safety Answering Point (PSAP).

Emergency response systems rely on the rapid and accurate transmission of information between the public and emergency service providers. Emergency call handling and/or dispatch centers, generally referred to as Public Safety Answering Points (PSAPs), including for example, call and/or dispatch centers for the police, fire department, emergency medical services, and/or the like, serve as critical nodes within this infrastructure, functioning as the initial point of contact for individuals reporting emergencies. Upon receiving a call, PSAP operators must quickly assess the situation, collect relevant event details, and dispatch appropriate emergency services. The speed and accuracy with which this information is processed can have a significant impact on the outcome of the emergency response, as the ability to provide prompt and effective assistance while at the same time maximizing utilization and impact of constrained resources greatly depends on those factors.

SUMMARY

It is an object of the present disclosure to describe systems and methods for autonomous emergency call handling and dispatch.

The foregoing and other objects are achieved by the features of the independent claims. Further implementation forms are apparent from the dependent claims, the description and the figures.

According to an aspect of some embodiments of the disclosed subject matter there is provided an apparatus for autonomous public safety answering point (PSAP), comprising: at least one processing circuitry adapted for: receiving at least one emergency call originating from at least one client device used to report at least one emergency event; initiating at least one artificial intelligence (AI) agent for handling the at least one emergency call, configured for: classifying the at least one emergency event into one of a plurality of event types associated with a plurality of response protocols according to data extracted from the at least one emergency call; initiating at least one emergency event report interaction via the at least one client device for prompting at least one reply to at least one query relating to the at least one emergency event, driven each by a respective one of the plurality of response protocols according to classification of a respective one of the at least one emergency event; determining at least one event attribute of the at least one emergency event according to data extracted from the at least one reply received to the at least one query; populating at least one entry of at least one emergency event record for computer aided dispatch (CAD) of responder units to emergency events according to the at least one event attribute; and responsive to a determination to dispatch at least one responder unit to address the at least one emergency event, dispatching the at least one responder unit according to the at least one emergency event record.

According to another aspect of some embodiments of the disclosed subject matter there is provided a computer program product comprising: a non-transitory computer readable storage medium; program instructions for executing, by a processor, a method for providing autonomous public safety answering point (PSAP), the method comprising: receiving at least one emergency call originating from at least one client device used to report at least one emergency event; initiating at least one artificial intelligence (AI) agent for handling the at least one emergency call, configured for: classifying the at least one emergency event into one of a plurality of event types associated with a plurality of response protocols according to data extracted from the at least one emergency call; initiating at least one emergency event report interaction via the at least one client device for prompting at least one reply to at least one query relating to the at least one emergency event, driven each by a respective one of the plurality of response protocols according to classification of a respective one of the at least one emergency event; determining at least one event attribute of the at least one emergency event according to data extracted from the at least one reply received to the at least one query; populating at least one entry of at least one emergency event record for computer aided dispatch (CAD) of responder units to emergency events according to the at least one event attribute; and responsive to a determination to dispatch at least one responder unit to address the at least one emergency event, dispatching the at least one responder unit according to the at least one emergency event record.

According to yet another aspect of some embodiments of the disclosed subject matter there is provided a method of providing autonomous public safety answering point (PSAP), comprising: receiving at least one emergency call originating from at least one client device used to report at least one emergency event; initiating at least one artificial intelligence (AI) agent for handling the at least one emergency call, configured for: classifying the at least one emergency event into one of a plurality of event types associated with a plurality of response protocols according to data extracted from the at least one emergency call; initiating at least one emergency event report interaction via the at least one client device for prompting at least one reply to at least one query relating to the at least one emergency event, driven each by a respective one of the plurality of response protocols according to classification of a respective one of the at least one emergency event; determining at least one event attribute of the at least one emergency event according to data extracted from the at least one reply received to the at least one query; populating at least one entry of at least one emergency event record for computer aided dispatch (CAD) of responder units to emergency events according to the at least one event attribute; and responsive to a determination to dispatch at least one responder unit to address the at least one emergency event, dispatching the at least one responder unit according to the at least one emergency event record.

Optionally, the at least one AI agent comprises at least one voice agent.

Optionally, the at least one voice agent uses speech-to-text and/or text-to-speech conversion.

Optionally, the at least one AI agent is configured for processing multi-modal input comprising at least one member selected from the group consisting of: text; imagery; audio; and video.

Optionally, the at least one AI agent is further configured for filtering out non-emergencies and/or misrouted calls according to results of the classifying.

Optionally, the at least one AI agent is further configured for determining a priority level of the at least one emergency event when performing the classifying and/or the at least one emergency event report interaction.

More optionally, the at least one AI agent is further adapted for adjusting the priority level of the at least one emergency according to the at least one reply and/or data obtained during the at least one emergency event report interaction.

Optionally, the at least one AI agent is further configured for providing to at least one user of the at least one client device at least one pre-arrival instruction retrieved according to information populated at the at least one entry of the at least one emergency event record.

Optionally, the at least one AI agent is further configured for interfacing at least one resource selected from the group consisting of: advanced mobile location (AML) service; automatic number identification (ANI) service; automatic location identification (ALI) service; public safety communication platform; response protocols knowledge base; CAD service; electronic health record (EHR) database; emergency contacts database; sensor data; and internet-of-things (IoT) data.

More optionally, the at least one AI agent is further configured for determining location of the at least one client device according to data retrieved from the AML service, and using the location for populating at least one another entry of the at least one emergency event record.

More optionally, the at least one AI agent is further configured for using the location in the at least one emergency event report interaction to refine the at least one query, and populating the at least one another entry according to the at least one reply to the at least one query refined.

Optionally, the at least one AI agent is further configured for receiving at least one status report provided by the at least one responder unit via at least one CAD interface, and updating the at least one emergency event record according to the at least one status report.

Optionally, the at least one AI agent comprises: at least one triage agent configured for performing the classifying, wherein the plurality of event types comprise at least one of a medical event, a fire event, and a police event; and at least one member selected from the group consisting of a medical agent, a fire agent, and a police agent configured for performing the at least one emergency event report interaction, determining the at least one event attribute, populating the at least one entry, and dispatching the at least one responder unit.

Optionally, there is further performed monitoring the at least one emergency event report interaction and generating an alert responsive to detection of anomaly or trigger condition.

More optionally, there is further performed routing a respective one of the at least one emergency call to a human operator responsive to the detection.

Optionally, each of the at least one emergency call is initiated by a user or an automated device.

Optionally, the at least one AI agent uses at least one large language model (LLM) for providing output and/or processing input.

More optionally, the at least one LLM is enhanced with retrieval-augmented generation (RAG).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
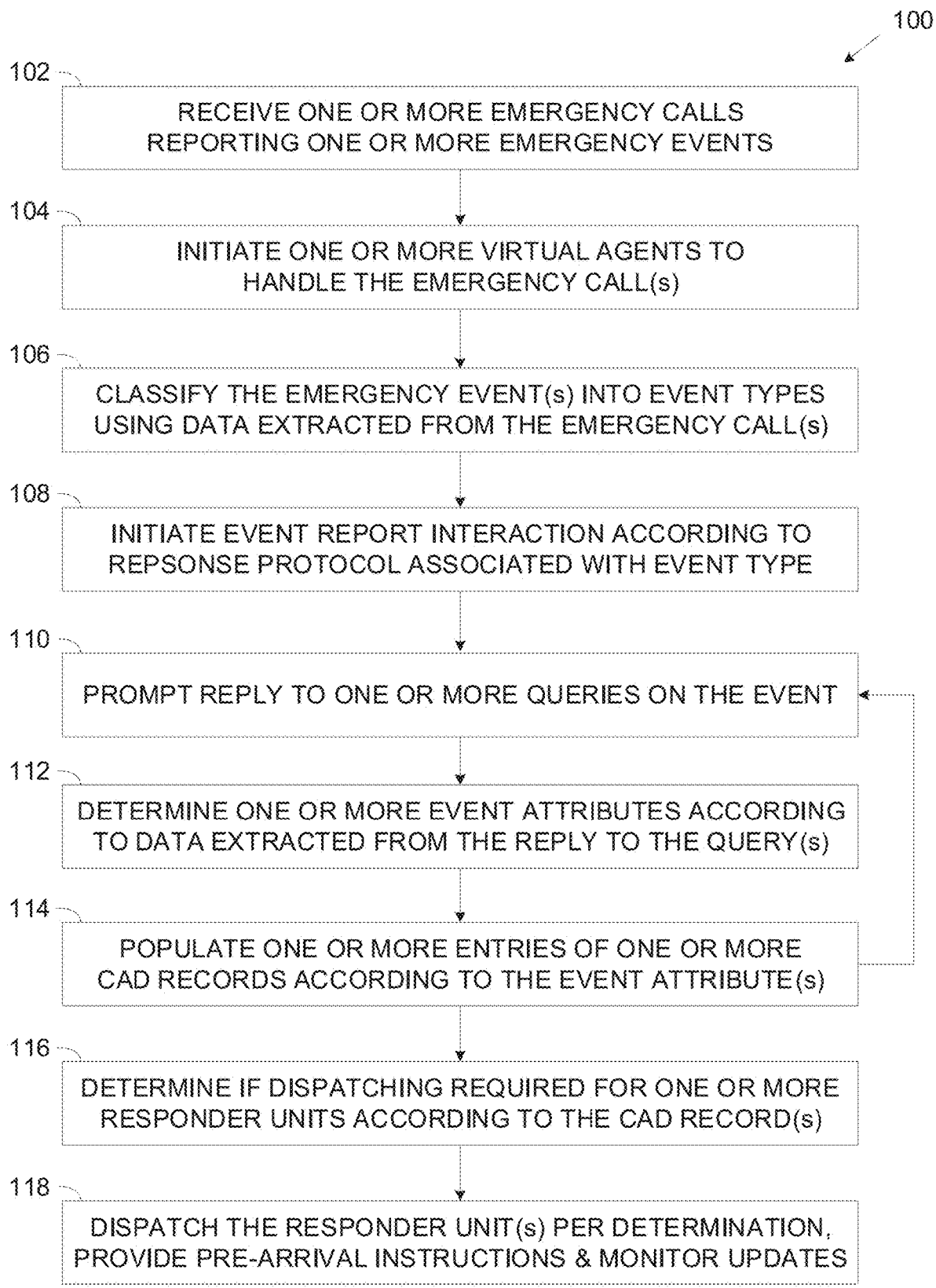
FIG. 1 is a flowchart of an exemplary process of autonomous emergency call handling and dispatch, according to some embodiments.

Some embodiments described in the present disclosure relate to automated emergency services and, more specifically, but not exclusively, to systems and methods for autonomous emergency call handling and dispatch, and in particular, to an artificial intelligence (AI) agent-driven autonomous Public Safety Answering Point (PSAP).

Timely intervention is particularly critical in high-risk incidents such as cardiac arrests, fires, and active threats, where delays of even a few seconds can result in severe injury or loss of life. Accordingly, efforts to reduce call processing time and streamline the collection of incident data are essential. Current PSAP operations often involve a sequence of manual questioning and data entry steps that may introduce latency or inconsistencies, especially under high call volumes or in cases involving communication barriers.

Moreover, accurate receipt and interpretation of event details are vital for effective resource allocation. Misdirected or misinformed dispatch decisions can lead to the deployment of inadequate or excessive resources, negatively impacting the overall emergency response network. Enhanced data accuracy enables emergency personnel to arrive better prepared, improving both responder safety and situational control upon arrival.

Another important consideration in the operation of PSAPs is the cognitive load placed on emergency call-takers. Operators are frequently exposed to high-stress situations and emotionally intense conversations, often for extended periods and without significant breaks. Repeated exposure to traumatic content, coupled with the constant demand for rapid decision-making and multitasking, contributes to operator burnout and fatigue. These factors not only affect personnel well-being but can also degrade performance over time, leading to slower response times and an increased risk of error.

Public confidence in emergency services is closely linked to the perceived effectiveness and speed of these systems. As a result, agencies are increasingly subject to regulatory standards that mandate minimum performance benchmarks related to response times and dispatch accuracy. Organizations such as the National Emergency Number Association (NENA) and the National Fire Protection Association (NFPA) have established guidelines that underscore the importance of minimizing processing delays and maximizing the fidelity of received data.

According to some embodiments, there are provided methods, systems, devices and computer program products for autonomous emergency call handling and dispatch. One or more incoming emergency calls initiated to report one or more emergency events received at one or more call enters, for example, a PSAP, a dispatch center, and/or the like, may be responded to by one or more virtual agents. A virtual agent answering an incoming emergency call received at the call center may classify it into one of a plurality of event type categories, such as for example, a police event, a fire event, a medical event, and/or the like, according to data extracted from the call. Based on the classification, the virtual agent may then initiate an emergency event reporting interaction flow with the calling entity (human or device) according to a response protocol associated with the respective event type. The virtual agent may prompt a response from the calling entity to one or more queries generated according to the response protocol, and retrieve one or more event attributes of one or more emergency events from the response received to the one or more queries. The retrieved event attributes may be used by the virtual agent to populate one or more entries of one or more emergency event records for Computer Aided Dispatch (CAD) of responder units. Based on the populated CAD records, a determination may be made by the virtual agent as to whether and which responder unit(s) to dispatch to address the emergency event(s). Responsive to a determination to dispatch one or more responder units to address one or more emergency events according to the CAD records, the virtual agent may automatically dispatch the responder unit(s) accordingly.

The virtual agents initiated to handle the incoming emergency calls may be Interactive Voice Response (IVR) agents adapted to interact with human callers using voice communication. The virtual agents may be powered by Artificial Intelligence (AI) and/or Machine Learning capabilities throughout their decision-making and/or input assessment processes. The virtual agents may use one or more analytical and/or generative tools and/or techniques for speech recognition and/or speech synthesis, such as for example, Speech-To-Text (STT) and/or Text-To-Speech (TTS) models for conversion of input obtained from and/or output directed to the caller, Natural Language Processing (NLP), Large Language Models (LLMs), Retrieval-Augmented Generation (RAG), and/or the like. Additionally or alternatively, the IVR agents may employ Voice-to-voice model(s) that process voice inputs and generates voice outputs without conversion to and/or from textual representation. The speech analysis and/or generation models used may be tailored to emergency scenarios contextual processing for optimizing accuracy and speed of obtaining necessary event details from callers. Optionally the virtual agents may harness AI to predict and/or pre-populate data entries in an incident record, based on partial information already gathered from a caller and/or IoT device during an ongoing call, and/or in other recent and/or concurrent ongoing calls originating from different client devices. The virtual agents may prompt the caller to confirm and/or provide feedback (e.g., corrections, adjustments, etc.) on the predictions and/or suggestions for incident record data entries to ensure accuracy of the information.

The virtual agents may include various task-specific agents, for example, a triage agent may be tasked with initially answering an emergency call and gathering basic information to determine what type of emergency event is at hand (e.g., fire, medical emergency, incident calling for police intervention, etc.) and what its priority is, i.e., level of urgency and/or severity thereof. Optionally the triage agent may be further configured for filtering out non-emergencies and/or misrouted calls based on the results of the classification.

Based on the classification of the call to one of the predefined categories of event types, another agent specialized for handling incidents belonging to the respective event type category, e.g., a fire agent, a medical agent, a police agent, and/or the like, may take over and continue handling the call, i.e., interact with the caller to gather any and all additional information necessary for dispatching the call, and/or provide pre-arrival instructions until responder teams reach the scene and/or take control of the event. The agent may receive status updates from responders handling the event and log the information in the incident file. Once the situation is under control the agent may close and archive the incident record.

The event type specialized agents may be configured to employ established response protocols in accordance with international standards and/or applicable laws, regulations, etc., such as for example, the call taking protocols of the International Academies of Emergency Dispatch (IAED) employed by ProQA emergency dispatch service, referred to herein in short as "ProQA protocols". The questioning process may be guided by and/or structured according to a decision tree associated with the response protocol selected, where each branching may represent different possible answers to the questions, and a leaf reached may signify exhaustion of interrogation and gathering of all required incident information. The agents may also adjust the initial priority assigned to the incident by the triage agent, based on the additional incident details and/or information otherwise obtained throughout the call, e.g., sudden escalation and/or deterioration of the situation and/or the like.

The autonomous PSAP in accordance with the disclosed subject matter may be configured for supporting and processing multi-modal inputs and/or outputs, whether via a multi-modal gateway with inter-modal conversion capabilities and/or by the virtual agents directly ingesting and/or outputting data in diverse modalities. For example, in addition to sound and/or voice signals and/or audio data streams, as may be conveyed in conventional calls via client devices such as landline and/or cellular telephones, the multi-modal gateway and/or agents may be configured to receive and/or process textual information, images, video, and/or other structured or non-structured data streams shared by client devices from which emergency calls originate.

The virtual agents may be configured to interface with various internal and/or external resources, optionally provided to the agents in the form of flexible agentic functional tools, resembling discrete callable functions with defined inputs and outputs that may be dynamically invoked by the agents throughout operation. These resources may include, for example, location services such as Advance Mobile Location (AML), Automatic Number Identification (ANI), Automatic Location Identification (ALI), and/or the like. Additionally or alternatively, location data may be obtained via safety platforms such as Next Generation 911 (NG911) and/or the like. Other resources accessed by the virtual agents via the agentic toolbox may include local and/or remote databases and/or repositories in structured and/or non-structured format, for example, response protocols knowledgebase, emergency contacts list, user medical history, sensor data, and/or the like. In some embodiments, the dispatching of calls by the virtual agents may be performed via CAD services similarly operated and controlled as one of the agentic tool functions. The CAD services may be available either as an integrated platform in a same environment with the virtual agents or deployed on external systems that the agents may communicate with.

The interaction of the virtual agents with callers may be constantly monitored to ensure proper functioning and/or allow for corrective measures to be taken as needed. Trigger conditions such as poor communication, abnormal performance, high risk situations, and/or the like, may be flagged and alerts may be issued to a human supervisor to provide instructions and/or take over manually at discretion.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of autonomous emergency call handling and dispatch, according to some embodiments.

An exemplary process 100 may be executed to handle and/or dispatch automatically and autonomously incoming emergency calls initiated to report one or more emergency events received at one or more call enters, for example, a PSAP, a dispatch center, and/or the like.

Figure 2:
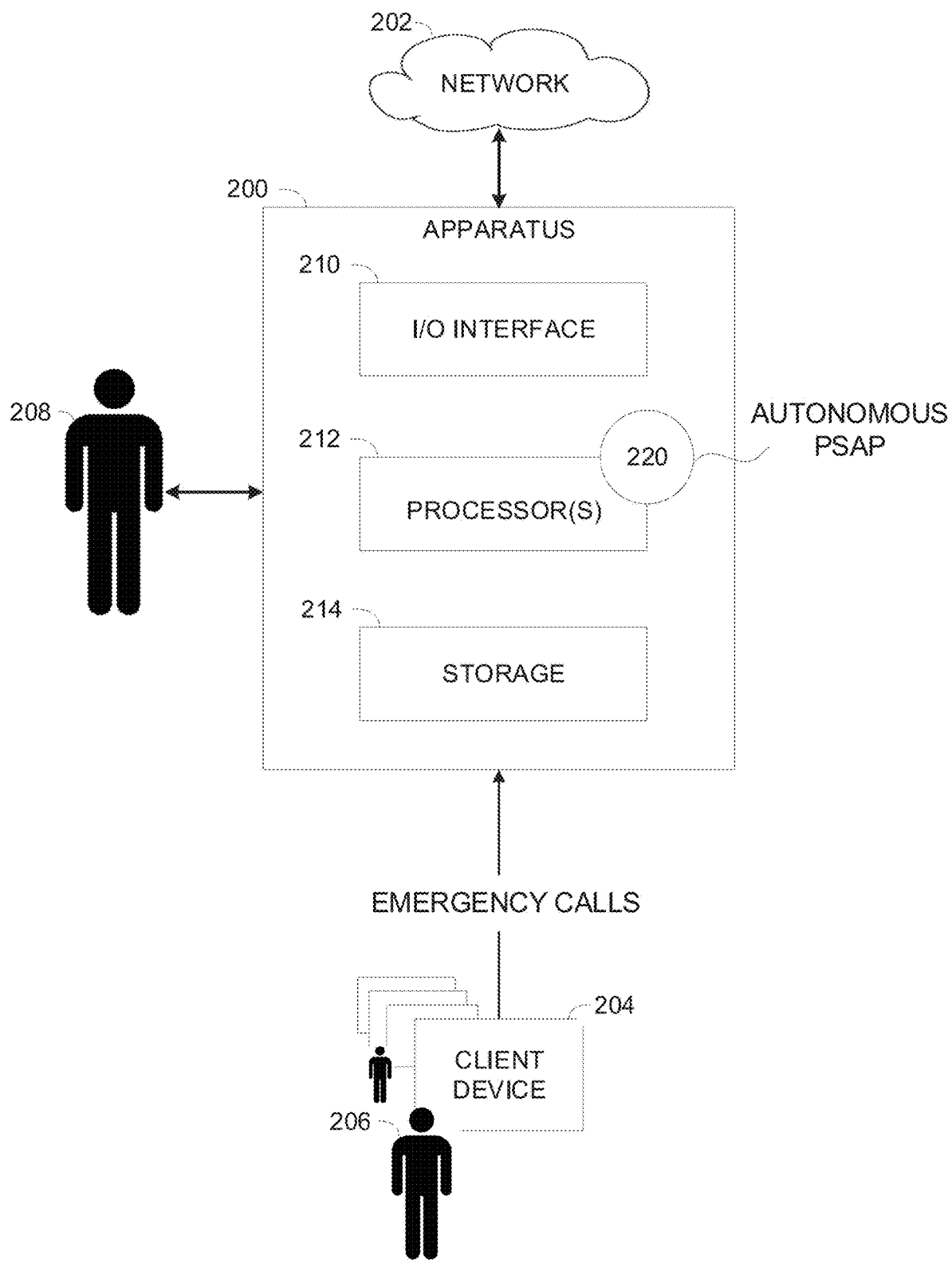
FIG. 2 is a schematic illustration of an exemplary apparatus for autonomous emergency call handling and dispatch, according to some embodiments.

Reference is also made to FIG. 2, which is a schematic illustration of an exemplary apparatus for autonomous emergency call handling and dispatch, according to some embodiments.

An exemplary apparatus 200 may be deployed in and/or service one or more call enters, for example, a PSAP, a dispatch center, and/or the like, for autonomously handling and dispatching incoming emergency calls originating from one or more client devices 204.

One or more of the client devices 204, for example, a phone, a cellular phone, a network connected wearable and/or portable device, and/or the like may be associated with respective users 206 who may use their client devices 204 to initiate one or more emergency calls to the call center(s).

However, one or more of the client devices 204 may initiate emergency calls automatically with no human intervention. For example, the client devices 204 may include one or more devices which are typically operated by users 206, for example, a phone, a cellular phone, a network connected wearable and/or portable device, and/or the like which are adapted to automatically initiate emergency calls responsive to detecting, and/or estimating one or more emergency events relating to the user 206, for example, a medical condition (e.g., heart attack, a seizure, a stroke, etc.), a personal accident (fall, drop, etc.), and/or the like. In another example, the client devices 204 may include one or more vehicular network connected devices, systems, and/or units deployed in one or more vehicles and adapted to automatically initiate emergency calls responsive to detecting, and/or estimating one or more emergency events relating to the vehicle and/or to one or more of the vehicle's passengers. In another example, the client devices 204 may include one or more network connected devices, systems, and/or units of one or more monitoring stations adapted to initiate emergency calls automatically responsive to detecting one or more emergency events, for example, forest fires, car accidents, nature emergency events (e.g., earthquake, tsunami, tornado, etc.), and/or the like. In another example, the client devices 204 may include one or more network connected devices, systems, and/or units acquiring and analyzing sensory data, e.g., cameras capturing and processing imagery data and/or the like, adapted to initiate emergency calls automatically responsive to detecting, and/or estimating one or more emergency events relating to a region of interest and/or individuals present therein as depicted in the sensory data gathered.

Moreover, one or more client devices 204 associated with respective users 206 may automatically initiate one or more emergency calls (e.g., SOS call) responsive to detecting, and/or estimating one or more emergency events relating to their associated user 206 and/or a companion of the user 206, for example, a medical condition (e.g., heart attack, seizure, etc.), an accident (e.g., a car accident, drowning, a fall, etc.), a violence incident, a hazard and/or danger (e.g., earthquake, blizzard, etc.), and/or the like.

The apparatus 200, for example, a server, a computing node, a cluster of computing nodes and/or the like may include an Input/Output (I/O) interface 210, processor(s) 212, a storage 214 for storing data and/or code (program store), and/or the like. The apparatus 200 may be used and/or operated by one or more PSAP operators 208, for example, a supervisor, an administrator, a staff member, a foreperson, a manager, and/or the like.

The I/O interface 210 may include one or more Human-Machine Interfaces (HMI) for interacting with the PSAP operator(s) 208, for example, a keyboard, a pointing device (e.g., a mouse, a touchpad, a trackball, etc.), a screen, a touchscreen, a digital pen, a speaker, an earphone, a microphone and/or the like. The PSAP operator 208 may therefore operate one or more of the HMI interfaces of the I/O interface 210 to interact with the apparatus 200.

The I/O interface 210 may include one or more wired and/or wireless I/O interfaces, ports, interconnections and/or the like for connecting to one or more external devices, for example, a Universal Serial Bus (USB) interface, a serial interface, a Radio Frequency (RF) interface, a Bluetooth interface and/or the like. Through the I/O interface 210, the apparatus 200 may communicate with one or more external devices (not shown) attached to the I/O interface(s), for example, an attachable mass storage device, an external media device and/or the like.

The I/O interface 210 may include one or more wired and/or wireless network interfaces for connecting to a network 202 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet, a Public Switched Telephone Networks (PSTN), and/or the like. Using the network interface(s) of the I/O interface 210 the apparatus 200 may communicate, via the network 202, with one or more remote network resources (not shown), such as, for example, one or more servers, computing nodes, clusters of computing nodes, platforms, systems, services, and/or the like, that may be configured to receive data from and/or provide data to the apparatus 200. Through the network 202 the apparatus 200 may further communicate with one or more devices, systems, services and/or the like, for example, a computer, a server, a laptop, a mobile device and/or the like, used by the one or more PSAP operators 208 for interacting with the apparatus 200.

Via the network interface(s) of the I/O interface 210, the apparatus 200 may receive a plurality of emergency calls initiated from a plurality of client devices 204. Moreover, via the network interface(s) of the I/O interface 210, the apparatus 200 may further communicate with one or more networked resources (not shown), for example, an Advance Mobile Location (AML) service, a phone service subscribers database, and/or the like.

The processor(s) 212, homogenous or heterogeneous, may include one or more processing nodes arranged for parallel processing, as clusters and/or as one or more multi core processor(s).

The storage 214 may include one or more non-transitory memory devices, for example, persistent devices such as, for example, a ROM, a Flash array, a hard drive, an SSD, a magnetic disk and/or the like, and/or volatile devices such as, for example, a RAM device, a cache memory and/or the like. The storage 214 may further comprise one or more local and/or remote network storage resources, for example, a storage server, a Network Attached Storage (NAS), a network drive, a cloud storage service and/or the like accessible via the network 202.

The processor(s) 212 may execute one or more software modules, for example, a process, a script, an application, an agent, a utility, a tool, an Operating System (OS), a service, a plug-in, an add-on, and/or the like each comprising a plurality of program instructions stored in a non-transitory medium (program store) such as the storage 214 and executed by one or more processors such as the processor(s) 212.

Optionally, the processor(s) 212 further include, utilize and/or apply one or more hardware elements available to the apparatus 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The processor(s) 212 may therefore execute one or more functional modules utilized by one or more software modules, one or more of the hardware modules and/or a combination thereof. For example, the processor(s) 212 may execute an autonomous PSAP 220 functional module adapted for executing the process 100.

The apparatus 200 may store one or more data records, for example, a file, a list, a table, a database, and/or the like, for example, in the storage 214 for storing data relating to one or more emergency events, one or more emergency calls, and/or the like. For example, the apparatus 200 may store data relating to active and/or ongoing emergency events and/or emergency calls, historic data relating to past emergency events and/or emergency calls, and/or the like.

Optionally, the apparatus 200, specifically the autonomous PSAP 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

One or more devices, systems, services and/or the like (not shown) used by one or more PSAP operators 208 may execute one or more applications, services and/or tools for communicating with the apparatus 200 and more specifically with the autonomous PSAP 220 to enable one or more of the PSAP operators 208 to interact with the autonomous PSAP 220. For example, one or more devices, systems, services and/or the like used by the one or more PSAP operators 208 may execute a web browser for communicating with the autonomous PSAP 220 and presenting a User Interface (UI), specifically a Graphical UI (GUI) which may be used by the respective PSAP operator(s) 208 to interact with the autonomous PSAP 220. In another example, one or more one or more of the devices, systems, services and/or the like used by the one or more PSAP operators 208 may execute a local agent which communicates with the autonomous PSAP 220 and presents a GUI which may be used by the respective PSAP operators 208 to interact with the autonomous PSAP 220.

For brevity, the process 100 is described herein for autonomous handling and dispatch of one or more emergency calls received from one or more client devices 204 operated to report one or more emergency events using one or more virtual agents, with the description focusing on a single interaction of a respective one of the virtual agents with a calling entity in a single discrete call. This, however, should not be construed as limiting since the process 100 may be repeated, duplicated, and/or scaled to support multiple, optionally concurrent, emergency events report intake interactions by several virtual agents.

Moreover, also for brevity, the process 100 is described for autonomous handling and dispatch of one or more emergency calls received by a single apparatus 200 deployed at a single discrete location, e.g., a call center and/or the like. This also should not be construed to be limiting since the process 100 may be repeated, duplicated, and/or scaled to support multiple call centers and/or instances of apparatus 200 each adapted to receive a plurality of emergency calls initiated to report one or more emergency events.

As shown at 102, the process 100 may start with the autonomous PSAP 220 receiving one or more emergency calls originating from one or more client devices 204 used to report an emergency event. In particular, the autonomous PSAP 220 receives and handles the incoming emergency calls automatically with no human intervention.

As stated herein, one or more emergency calls may be initiated by one or more users 206 using their respective client devices 204, for example, phone, cellular phone, smartphone, network-connected wearable and/or portable device (e.g., smart watch, emergency button, etc.), and/or the like to report the emergency event. However, one or more emergency calls may be initiated automatically by one or more automated devices, systems, and/or units adapted to use one or more associated client devices 204 to initiate emergency calls. Additionally or alternatively, some of the emergency calls may be received via asynchronous communication, such as for example, as one or more text messages sent via Short Message Service (SMS), chat applications, and/or dedicated emergency applications and/or services, e.g., text-to-911 and/or the like.

As shown at 104, the autonomous PSAP 220 may initiate one or more virtual agents to handle the emergency call(s) received at 102. The virtual agents may instantly answer the incoming calls, eliminating or reducing waiting times to a minimum. The virtual agents may be Interactive Voice Response (IVR) agents, adapted to interact with human callers using voice communication, optionally driven by an Artificial Intelligence (AI) engine and/or the like. The virtual agents may use one or more Speech-to-Text (STT), Text-to-Speech (TTS) and/or Voice-to-voice models optimized for emergency scenarios. The virtual agents may be configured to use a natural sounding and calming voice for their synthesized speech to make callers comfortable as much as possible in the circumstances. The agents may start each conversation with, e.g., "911, what is your emergency?" and/or the like. Optionally, the virtual agents may be configured to support multi-language communication with the caller to improve accessibility and optimize the incident imitation and/or intake flow.

The agents may process the input from the caller (e.g., spoken words by a human, data stream from an IoT device, and/or the like) to extract information relating to the event. The agent may feed the event information into a newly created incident record. The extracted information may include caller information, e.g., for a call originating from a client device such as a phone, the handling agent may retrieve the phone number via Automatic Number Identification (ANI) services and/or the like, so that in case the call gets disconnected, the agent may automatically call back and resume the call from the last step before the call abnormally terminated. Additionally or alternatively, the agent may utilize a textual messaging fallback channel, e.g., two-way SMS texting and/or the like, in case that the voice call is dropped and/or cannot be re-established.

As shown at 106, the autonomous PSAP 220 may classify each emergency event into one of a plurality of event type categories based on the information extracted by each agent from the respective call (or, in some cases, by a group of agents handling multiple calls relating to a same event), for example, a fire, a medical emergency, a police incident, and/or the like. Each category may be associated with a different response protocol based on which subsequent interaction with a caller for handling the event, i.e., gathering relevant information for dispatching responders to the scene, providing immediate instructions to mitigate the emergency prior to arrival on site, and/or the like, may be carried out. The classification of each event may also include a priority level, i.e., urgency, severity, and/or the like. The priority may be determined by the agent, for example, according to sentiment analysis of the caller's voice (e.g., detected signs of panic, distress, etc.), usage of certain keywords in the call (e.g., "gunshot wound", "bomb threat"), and/or the like. Optionally the classification may be performed by a dedicated triaging agent.

As shown at 108, the autonomous PSAP 220 may initiate an event report interaction between the virtual agent and the caller according to the response protocol associated with the event type as classified at 106, with the aim of gathering from the caller all essential details relating to the event. The interaction flow may include structured prompts based on defined emergency response protocols, such as for example, ProQA and/or other likewise standards applied locally and/or nation-wide, used in a sequential and/or iterative manner with the interrogation of the caller progressing from one question to another based on each answer received, in a decision tree traversal fashion. Optionally the interaction may be performed by a dedicated call-taking agent specialized for the particular event type, e.g., a fire agent, a medical agent, a police agent, and/or the like.

As shown at 110, the autonomous PSAP 220 may operate the virtual agent to prompt the caller to reply to one or more queries on the emergency event, guided by the selected response protocol. For example, if the event type was classified at 106 as medical, the agent may ask questions regarding symptoms, injuries, vital signs, and/or the like. Additionally, the agent may integrate with medical triage protocols, AI models, and/or the like to assist medical responder teams, provide immediate instructions to the caller, guide dispatch decisions, and/or the like. As another example, if the event type was classified at 106 as fire, the agent may ask questions regarding fire type, hazards, injuries, and/or the like. As another example, if the event type was classified at 106 as police, the agent may ask questions regarding weapons, suspect descriptions, urgency, and/or the like.

In case of an automated call such as an IoT alert and/or the like, the process 100 may skip the actions at 108 through 112 and proceed directly to 114 as all relevant event information had been already provided in a structured format via the call.

As shown at 112, the autonomous PSAP 220 may determine one or more event attributes of the emergency incident according to data extracted from the reply received to the one or more queries presented to the caller by the virtual agent at 110. The event attributes may include location information, optionally obtained automatically using location services and confirmed by the caller. For example, for each emergency call received at 102 from a client device, the autonomous PSAP 220 may retrieve location information of the client device using services such as Automatic Number Identification (ANI) and/or Automatic Location Identification (ALI), and in case of a mobile device, Advanced Mobile Location (AML). Additionally or alternatively, enhanced geolocation information may be obtained via emergency response platforms such as Next Generation 911 (NG911) and/or the like. The agent may automatically fetch the location data and cross-verify it with input from the caller, e.g., by verbal confirmation request, for example, in case of discrepancy, the agent may ask, "I detected a different location, are you at [auto-detected address]?" and/or the like. Optionally, automated confidence scores may be computed and used to highlight uncertain location data. The event attributes may further include injuries and/or casualties, arrival and/or access directions, details of emergency units already present at the scene, physical and/or environmental conditions (e.g., terrain type, street location, weather conditions, etc.), and/or the like. Optionally, the agent may retrieve additional event data using further analysis and/or other input modalities, for example, background noise in an audio stream from the call may analyzed to detect indicative sounds like gunshots, explosions, screams, etc., visual data feeds shared by the caller and/or obtained from IoT device(s), e.g., a public safety camera located nearby and/or the like may be analyzed using image processing techniques and/or tools to extract relevant information, electronic health records (EHRs) may be fetched from a wearable device of the caller and analyzed to extract relevant medical data and/or sensory data (e.g., vital signs measurements etc.), and/or the like.

As shown at 114, the autonomous PSAP 220 may populate one or more entries of one or more Computer Aided Dispatch (CAD) report records based on the event attribute(s) as determined at 112 and/or retrieved directly from the IoT device that issued the automated call, where applicable. The process 100 may iterate the actions at 110 through 114 until all relevant event attributes have been obtained and the entries of the incident CAD record have been populated accordingly such that the call may be now ready for dispatching if necessary. Optionally, some of the entries may be automatically filled and/or pre-populated by the autonomous PSAP 220 to speed up event intake and/or help in guiding the caller to provide accurate information, e.g., by the agent prompting the caller to provide confirmation for automated suggestions and/or predictions of event details made by the autonomous PSAP 220. Additionally, the initial priority level assigned when classifying the event at 106 may be adjusted and/or updated based on the recent information gathered from the caller along the interaction flow at 110 through 114 (including any and all repetitions), e.g., if the caller reports a sudden deterioration of the situation and/or the like. Once all mandatory entries of the CAD record for the reported emergency incident have been filled, the process 100 may continue to 116 for making decisions on and/or handling automatically the dispatch of the emergency call.

The autonomous PSAP 220 throughout the actions at 104 through 114 may leverage AI techniques and/or tools to process inputs and/or drive its decision-making processes throughout the interaction flow. The autonomous PSAP 220 may perform real-time transcription of calls and apply machine learning models such as Large Language Models (LLMs) and/or the like to the transcribed calls for dynamically classifying the event, extract event attributes information, generate follow-up and/or clarifying questions, e.g. "Tell me exactly what happened?", and/or the like. The analysis may apply real-time Natural Language Processing (NLP), contextual understanding, speech-to-intent mapping, and/or the like, to improve call routing and/or selection of appropriate response protocol for the emergency event in hand at 106, recognize intent in the caller's speech and use it to guide the call based on patterns at 110 to 114, and/or the like. The structured decision trees of the associated response protocols and the prompt-reply interaction guided thereby may mimic actions of human call-takers, but its automated execution by the autonomous PSAP 220 may be carried out in a more well-organized and efficient manner in comparison.

As shown at 116, the autonomous PSAP 220 may determine if dispatching of one or more responder units may be required for addressing the emergency event(s) described in the CAD record(s) as generated throughout the actions at 106 to 114. The autonomous PSAP 220 may auto-route the call to the correct dispatch unit, e.g., police, fire department, emergency medical services (EMS), and/or the like. The autonomous PSAP 220 may interface with CAD-integrated Automatic Vehicle Location (AVL) services for real-time responder tracking. autonomous PSAP 220 may suggest optimal candidate responders based on various parameters, such as for example, distance to the emergency, traffic conditions, unit availability, and/or the like. Optionally, the autonomous PSAP 220 may apply predictive dispatching, i.e., by analyzing historical response times and suggesting the responder unit(s) most likely to arrive at the shortest time to the scene. The autonomous PSAP 220 may optimize and/or dynamically adjust its determination using real-time data such as for example, estimated times of arrival (ETAs) calculated based on location data, e.g., Global Positioning System (GPS) locations and/or the like. Optionally, if no units are available, the autonomous PSAP 220 may auto-escalate and issue an alert to the PSAP operator(s) 208.

As shown at 118, the autonomous PSAP 220 may dispatch the responder unit(s) per the determination reached at 116, if applicable. The autonomous PSAP 220 may provide pre-arrival instructions to the caller while waiting for the dispatch unit(s) to arrive and take control over the emergency, using the relevant response protocol. For example, the virtual agent handling the call may provide instructions for immediate medical operations such as cardiopulmonary resuscitation (CPR), choking response maneuver ("Heimlich"), and/or the like. In another example, the agent may provide evacuation instructions, e.g., for fires, active threats, etc. The instructions may be dynamically adjusted and/or refined based on caller feedback and/or the like, where the interactive guidance by the agent may contribute to caller compliance, and the automated speech coaching may ensure that instructions may be provided in a clear and calm manner. Optionally, the autonomous PSAP 220 may allow the caller to share multi-modal data input, e.g. sensor data, images, videos, and/or the like, allowing the agent to analyze and gain insights to the situation at hand. The autonomous PSAP 220 may monitor status updates from the dispatched responder unit(s) in real time, feed the data into the CAD database, and output relevant information to the PSAP operator(s) 208 accordingly, e.g., via respective dispatcher dashboards and/or the like. Whenever new information arrives from the field unit(s), the autonomous PSAP 220 may auto-log the update and optionally notify the PSAP operator(s) 208 if needed, e.g., in case of critical alerts and/or the like. If the situation worsens, the autonomous PSAP 220 may auto-reclassify severity and escalate.

The actions performed by the autonomous PSAP 220 at 116 and/or 118 may be further enhanced and/or guided by aggregated data analysis of multi-source input, e.g., from multiple calls and/or client devices. For example, the autonomous PSAP 220 may engage in trend detection, such as by analyzing multiple calls to identify large-scale emergencies, e.g., earthquakes, shootings, and/or the like. Additionally, historic data may be used for prioritization enhancement via machine learning (ML) and/or the like, for example, severity models may be refined based on past data accumulated at the autonomous PSAP 220 throughout its deployment and operation.

Upon receiving notice from the responder unit(s) that control over the emergency had been gained, the autonomous PSAP 220 may mark the event as closed and document the call handling in the CAD record. The autonomous PSAP 220 may generate a structured report including, e.g., the transcribed call log, the call classification(s), the responder actions taken, and/or the like. The autonomous PSAP 220 may flag critical cases for review, e.g., where feedback from the PSAP operator(s) 208 on the handling of the call and/or event may be called for. The autonomous PSAP 220 may provide automated analytics, e.g., response times and/or likewise reports for quality assurance audits. The autonomous PSAP 220 may also collect from the closed events training data used for improving future performance based on past experience.

Figure 3:
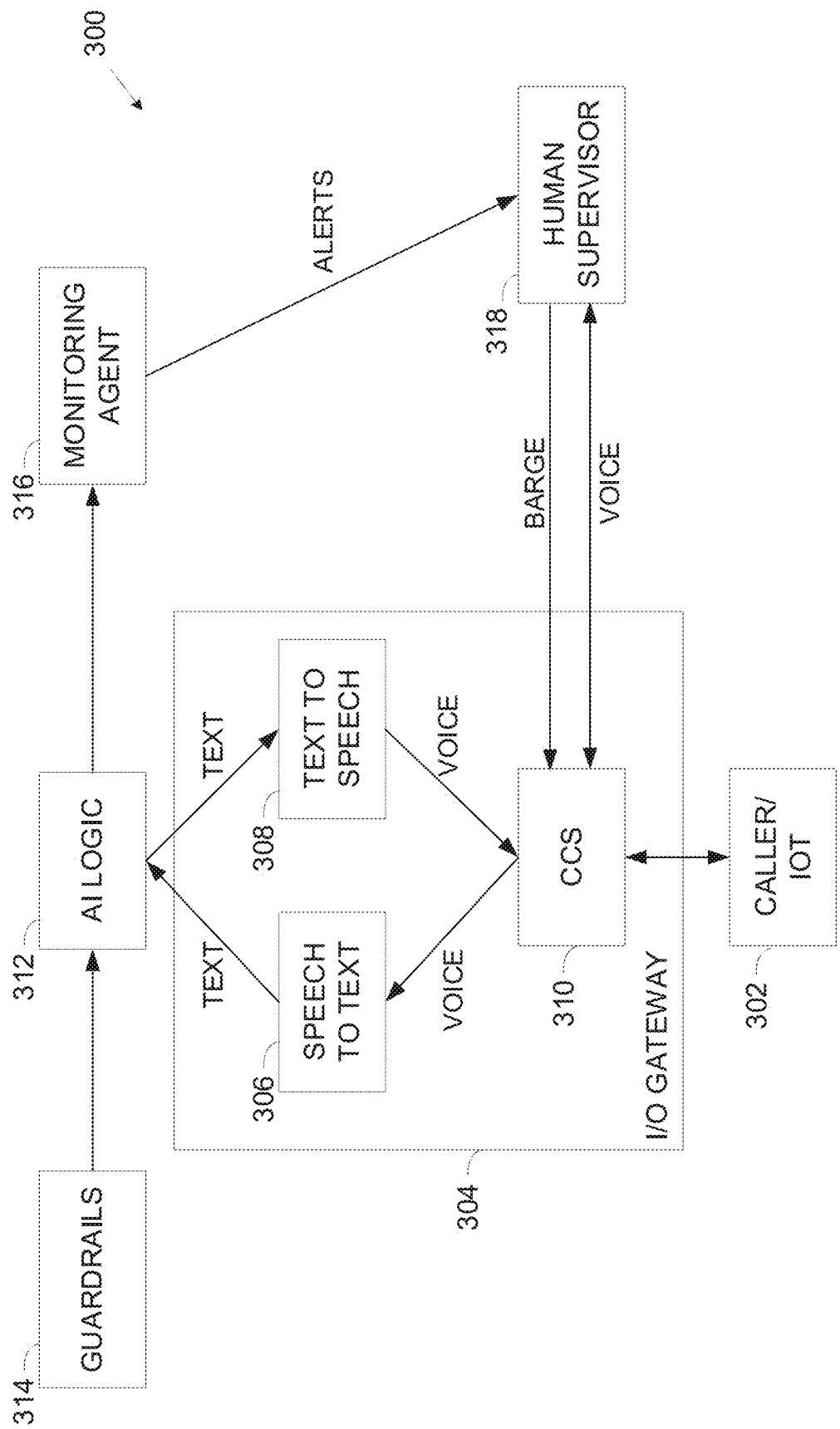
FIG. 3 is a schematic illustration of an exemplary architecture for autonomous emergency call handling and dispatch, according to some embodiments.

Reference is now made to FIG. 3 which is a schematic illustration of an exemplary architecture for autonomous emergency call handling and dispatch, according to some embodiments. An exemplary architecture 300 may be deployed for autonomous handling and dispatch of incoming emergency calls received at one or more emergency call centers, e.g., a PSAP, a dispatch center, and/or the like.

Figure 4:
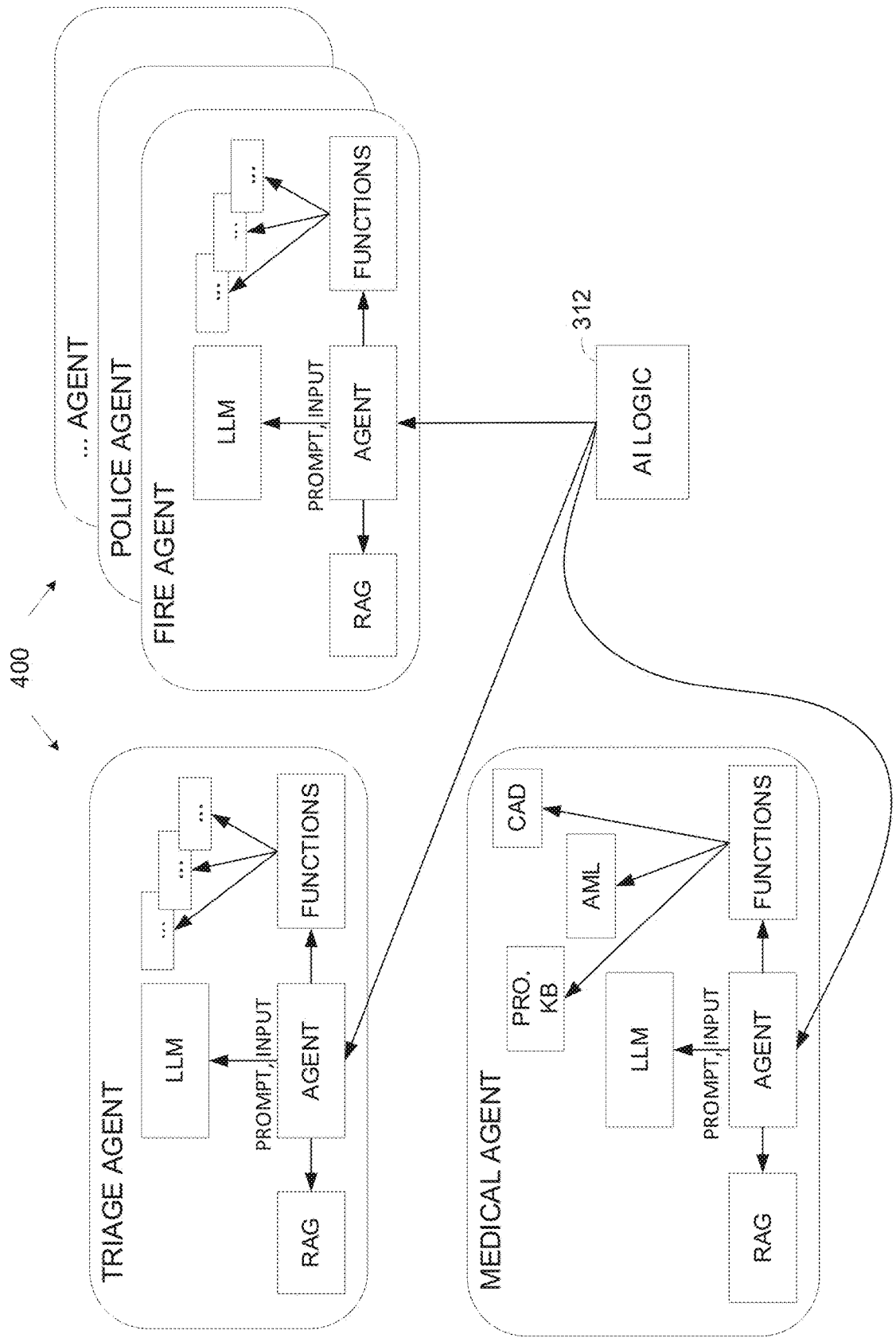
FIG. 4 is a schematic illustration of exemplary virtual agents for autonomous emergency call handling and dispatch, according to some embodiments.

Reference is also made to FIG. 4 which is a schematic illustration of exemplary virtual agents for autonomous emergency call handling and dispatch, according to some embodiments. One or more of exemplary virtual agents 400 may be integrated into the architecture 300 for providing one or more functionalities of an autonomous PSAP as described and illustrated herein.

As shown on FIG. 3, an emergency call may be initiated, either by a human caller operating a client device (e.g., dialing to an emergency phone number, using an emergency application, etc.) or by an automated device, system, and/or unit (e.g., an Internet-of-Things (IoT) device and/or the like), and arrive at a caller/IoT 302 interface for emergency event initiation. For example, a person may dial emergency services or send a text message via client device, e.g., phone, cellular phone, smartphone, network connected wearable and/or portable device (e.g., smart watch, emergency button, etc.), and/or the like to report the emergency event. As another example, automated devices such as crash sensors, fire alarms, wearable medical devices, and/or the like may automatically trigger an emergency call. As another example, connected sensors and/or devices may be capable of transmitting critical information beyond a voice call (e.g. crash data, smoke alarms) directly to an emergency call and/or dispatch center. As another example, public safety IoT devices, e.g., surveillance cameras, such as closed-circuit-television (CCTV) cameras and/or the like, may capture and analyze imagery and/or audiovisual data and detect emergencies such as vehicle accidents, gunfire, and/or the like, and automatically initiate an emergency call accordingly. The caller/IoT 302 interface may serve as an entry point for all emergency service requests, whether originating from human and/or IoT sources.

The emergency service requests initially received at the caller/IoT 302 interface may be forwarded to a communication gateway and/or communication management module such as an Input/Output (I/O) gateway 304. The I/O gateway 304 may be configured to receive and handle input in one or more modalities and/or formats, such as for example, text, audio (e.g., voice, sound, etc.), images, videos, and/or the like. The I/O gateway 304 may perform one or more pre-processing operations on the input, for example, converting between modalities, transforming various formats into standard forms, normalize inputs, and/or the like. The I/O gateway 304 may provide pre-processed input to one or more logical components, modules, functional units and/or the like of the architecture 300 in one or more respective forms accepted thereby for subsequent processing and/or analysis.

For example, as depicted in FIG. 3, the I/O gateway 304 may be configured to handle voice calls, using one or more multimodal input conversion modules, such as a Speech-To-Text 306 module, a Text-To-Speech 308 module, and/or the like, and optionally using a dataflow control module, such as a Call Control System (CCS) 310 for feeding incoming voice signals to the speech-to-text 306 module for conversion into text data and receiving outgoing voice signals as converted from text data by the Text-To-Speech 308 module to be forwarded to the caller/IoT 302 interface and provided as output to a human caller. Optionally the Speech-To-Text 306 module and/or the Text-To-Speech 308 module may be optimized for emergency scenarios contextual analysis and/or generation. For example, the Speech-To-Text 306 module may use word recognition models prioritizing or biased towards terms that are more frequent and/or likely to be used with relation to emergencies. As another example, the Text-To-Speech 308 module may be configured to synthesize voice and/or speech that is natural-sounding and/or otherwise aimed at instilling calmness, trust, confidence and/or likewise positive feelings in the caller, in spite of a dire situation they may be facing. It will be appreciated however that this depiction of the I/O gateway 304 as configured for handling voice calls is merely for illustrative purposes and not meant to be limiting, but rather, the I/O gateway 304 may support multimodal input and/or data sharing by a client device from which an emergency service request originated, i.e., text, images, video, data, and/or the like as well as any combination thereof may be supported and relayed via the I/O gateway 304 to be further processed and/or analyzed.

Optionally the I/O gateway 304 may perform one or more normalization operations, for example, speech-to-text transcription of voice calls (e.g., using the Speech-To-Text 306 module and/or the like), format conversion for video and/or data streams, and/or the like. Exemplary input methods and/or modalities optionally accepted and/or supported by the I/O gateway 304 may include any one or more of the following and/or combinations thereof:

Voice calls, e.g., phone calls from human callers, which may be provided as audio streams and/or the like from the caller/IoT 302 interface. The audio may be recorded by the I/O gateway 304, transcribed automatically and optionally in real time, e.g., using the Speech-To-Text 306 module, processed by one or more audio enhancement techniques and/or tools (e.g., noise reduction, speaker diarization, etc.), and/or the like.

Text messages and/or chats, e.g., Short Message Service (SMS) texts and/or messages from chat applications, which may be ingested directly in textual form by logics of the architecture 300.

Video calls and/or streams, as may be initiated and/or provided by callers, for example, a caller may opt to send a live video feed capturing an emergency event and/or the like, in which case the I/O gateway 304 may receive the video feed and pre-process it, for example, extract and/or analyze audio (e.g., convert voice to text etc.), extract and/or analyze visual information (e.g., detect sighting of fire, injuries, and/or the like), and/or the like.

Automated IoT alerts, including data-centric inputs such as may be received for example from devices, systems, and/or units of telematics (e.g., crash detectors on vehicular systems), smart buildings and/or infrastructure sensors (e.g., fire alarms, intrusion detectors, etc.), medical wearables, panic buttons, and/or the like may be ingested into the I/O gateway 304. Such automated input may include data in structured format, such as for example, sensor readings, location, etc. For example, a vehicle telematics alert may include crash severity and exact location. The I/O gateway 304 may parse the structured data transmitted by the respective IoT device that initiated the automated call (alert) and feed the event details into an emergency event record to ensure rapid and accurate processing.

Optionally the I/O gateway 304 may, subsequently to and/or concurrently with capturing the input, initially process and/or standardize any extracted information pertaining to the emergency event. For example, the I/O gateway 304 may combine speech input from a caller and sensor data from an IoT device, if both are available, into a unified case file and/or incident record.

The pre-processed input may be provided by the I/O gateway 304 to one or more logical components, modules and/or functions such as an AI logic 312. The AI logic 312 may be responsible for controlling flows of operations and/or data within the architecture 300 relating to and/or involving input analysis, decision-making and/or output generation in order to fulfil agentic functionalities for autonomous handling and dispatching of emergency calls, as described herein. Optionally the AI logic 312 may include and/or be coupled to one or more agentic functions and/or entities which may be specialized for distinct tasks, as the various exemplary virtual agents 400 illustrated on FIG. 4. The AI logic 312 may orchestrate activities of the different agents 400 and arbitrate which entities and/or functions may be necessary for each in order to collectively serve as a single unified virtual agent from an outside perspective, i.e., by other components and/or services interacting with the AI logic 312, directly or indirectly.

As shown in FIG. 4, the virtual agent(s) 400 operated and/or controlled by the AI logic 312 may include a triage agent configured for initial assessment of the event, and various event specific agents, e.g., a fire agent, a police agent, a medical agent, and/or the like, employing dedicated call taking protocols according to the respective event type, as categorized by the triage agent.

As shown and illustrated in FIG. 4, the virtual agents 400 of the exemplary architecture described herein (i.e., triage, medical, fire, police, etc.) may be provided with agentic modular toolbox functions calling capability ("Functions"), allowing the virtual agents 400 to interact with various resources (e.g., devices, systems, units, services, and/or the like, whether residing locally or remotely) in order to achieve their goals. These tools may be accessed and/or utilized at discretion of each of the virtual agents similarly as a human call taker and/or operator would use likewise resources.

For example, as depicted in FIG. 4 (e.g., in the medical agent context), functional tools made available to the virtual agents may include:

access to one or more Protocols Knowledge Bases ("Pro. KB"), which may store repositories and/or databases of widely adopted standard emergency response protocols like ProQA, local and/or state-specific response protocols, and/or the like;

interaction with location services and/or safety platforms capable of imparting location information, such as for example, Advance Mobile Location (AML) services, Automatic Number Identification (ANI) and/or Automatic Location Identification (ALI) services, Next Generation 911 (NG911), and/or the like;

interaction with Computer Aided Dispatch (CAD) services for incident record creation and/or management.

Other agentic tool functions may include interaction with additional structured and/or non-structured data resources, such as for example, Electronic Health Record (EHR) database, user medical history retained on-device, emergency contacts, sensor data, IoT data, and/or the like.

Each tool may be accessed and/or utilized in the form of a discrete, callable function with defined inputs and outputs. For instance, an SMS-sending tool may require a phone number and message as input parameters (i.e., function arguments) and return a success/failure status as output.

Each tool may be modular and context-driven, essentially acting as a special capability (similar to a dedicated UI widget or a callable function) that each virtual agent may use when needed. The agent may be provided with these capabilities in the form of a flexible toolbox and may dynamically choose the appropriate one based on the context of the incident. For instance, during a medical emergency call, the medical agent may retrieve triage questions from the Protocols Knowledge Base tool, and/or query the caller's medical history from a User Medical History Database tool, if such information may be deemed useful in the circumstances at hand. Such a modular design may also be advantageous in the sense that each tool may be developed and maintained independently of others (e.g., the AML tool can be updated without affecting the medical history tool), while providing the virtual agents with sufficient flexibility to handle a wide range of scenarios.

Importantly, it will be appreciated in this context that a tool call may differ from a traditional, hard-coded Application Programming Interface (API) request and/or the like. In a conventional approach, the sequence of API calls may be predetermined by a program's logic or workflow (for example, an emergency dispatch program may always fetch location first, then always log the call, then always dispatch units in that fixed order, etc.). In contrast, an agentic functional tool calling approach such as described herein may allow the virtual agents to decide at runtime which tool and/or API to call and when to call it, driven by the agent's real-time reasoning and the evolving situation, the key difference being the afforded autonomy of the agent in selecting and triggering each. The agent may evaluate the current state of the incident and invoke the relevant tool (or tools) as needed, rather than following a rigid script.

In summary, agentic tool calling means the virtual agents may dynamically activate and use the various resources at their disposal, much like that a human dispatcher would pick the right tool for the right job at the moment, rather than strictly adhering to a prescribed script. Exemplary standard uses of agentic tool calling capabilities in typical emergency call handling flow are discussed hereafter, however it will be appreciated that the disclosed subject matter is not meant to be limited in such manner, but rather, other and/or additional modular, customizable tool use depending on further needs and/or integrations may be supported as well.

As further shown and illustrated in FIG. 4, the virtual agents 400 of the exemplary architecture described herein (i.e., triage, medical, fire, police, etc.) may leverage AI capabilities, such as for example, employ one or more Large Language Models (LLMs) and/or the like, which may optionally be enhanced with Retrieval Augmented Generation (RAG) and/or the like. The exemplary roles and/or responsibilities of the agents 400 are discussed at further detail hereafter.

The virtual agents 400 may include a triage agent which may be configured to analyze the incoming information (e.g., real-time call transcription, text message, IoT data, and/or the like, such as may be relayed from the I/O gateway 304) and determine the event type and optionally its priority level (e.g., severity, urgency, etc.). The triage agent may be able to quickly categorize incidents (e.g., medical, fire, crime, etc.) based on initial input from a human caller and/or alert generated by an IoT device. The triage agent may parse key words and context from the audio streamed and/or text transcribed incoming call, even in cases where the caller may be frantic and/or unclear, for example.

Optionally the triage agent may use one or more tools and/or techniques of audio analysis and/or enhancement for information capture optimization and/or noise reduction, such as for example, speaker diarization, cross call sound correlation, signal conditioning, and/or the like. The audio data obtained and/or augmented from application of such tools may be leveraged for prioritization of incoming calls and/or incidents reported. For example, the triage agent may use voice biometrics to recognize repeat callers for expediting responses and/or prioritizing calls accordingly. As another example, the triage agent may use Speech-to-Intent mapping to recognize intent and parse the spoken information from the caller. As another example, the triage agent may use automated voice stress and/or sentiment analysis to detect life-threating urgency and/or the like, e.g., as may be indicated by panic or distress level. As another example, the triage agent may perform analysis of background noise and/or sounds to detect situational cues such as, for example, gunshots, explosions, distress sounds (e.g., screams, heavy breathing, etc.), and/or the like.

Based on the information capture and/or analysis results, the triage agent may then select a respective response protocol for handling the call further ahead. For example, if the call appears to be a medical emergency (e.g., words like "not breathing" detected in an input from caller, a call received originated from a heart monitor as an IoT alert, and/or the like), the triage agent may accordingly choose a medical response protocol. As another example, if keywords and/or contextual information parsed from the call suggest a fire (e.g. words like "smoke," "fire," sounds of alarms from smoke and/or heat detectors going off, etc.) the triage agent may select a fire response protocol. As another example, if the keywords and/or audio context imply a police intervention and/or law enforcement called for incident (e.g. words like "break-in," "assault", gunfire sounds, and/or the like), the triage agent may choose a police dispatch protocol.

The triage agent may be also configured to filter out non-emergencies or misrouted calls, where applicable. If the triage agent determines that the call is not truly an emergency (for instance, a general inquiry, an accidental dial, and/or the like), the triage agent may route the call to a non-emergency service or provide an automated response, rather than engaging the full emergency workflow.

Once the triage agent classifies the incident type and its urgency, a corresponding specialized event type-based virtual agent associated with the selected response protocol (i.e., for medical, fire, police, etc.) may be triggered by the AI logic 312 to gather detailed information from the caller.

The virtual agents 400 may include, further to the triage agent, a plurality of event-specific virtual agents associated each with a respective one of the different response protocols, such as the exemplary agents depicted in FIG. 4, including for example, a medical agent, a fire agent, a police agent, and/or the like. These agents may be configured to operate as virtual call takers guided by the respective response protocol in their decision-making and information extraction throughout the call. The respective response protocol driven virtual agent initiated for subsequently handling the incoming call may engage in a structured dialogue with the caller, and/or process the structured data received from the IoT device, following a predefined decision tree of questions and answers. The prompt-reply interaction between the virtual agent and the caller, and/or IoT device information capture and/or processing, may be based on a predetermined response protocol, such as ProQA and/or the like, as well as any other likewise local and/or state-wide protocols, as may be applicable. The response protocol(s) may be drawn from a protocol knowledge base accessible by the virtual agent as one of various functions provided thereto, as described herein. The response protocol virtual agents may be driven by and/or otherwise utilize AI capabilities, e.g., using LLM(s), RAG, and/or the like, similarly as the triage agent.

The response protocol driven virtual agent may systematically run through case entry and key questions to determine the nature of the emergency. During the interaction, the agent may also further refine the priority of the call and/or incident urgency. For example, a report of a person not breathing may be flagged as extremely urgent.

As an illustrative example, in case of a call classified as pertaining to a medical emergency event, the medical agent may ask questions such as, "What is the patient's age? Are they conscious? Are they breathing?" in a logical sequence, according to the configured medical protocol. Each answer given by the caller may be parsed by the medical agent and used to decide the next appropriate question, navigating the decision tree. Throughout this process, the response protocol driven agent may use the selected protocol script as a guide, ensuring that all critical questions are asked in the correct order, similarly as how a human call taker would flip through protocol cards and/or software. At the same time, the agent may perform information extraction in real-time, i.e., as the caller responds, the agent may pick out key data (e.g. "chest pain" in a medical event, "intruder left the scene" in a police event, etc.) and fill in structured fields in the incident record. By leveraging AI powered processing, the agent may be able to handle free-form descriptions from the caller, not just structured format answers (e.g., yes/no, indexed menu, etc.), thus allowing for a dynamic conversation. In case where the caller already provided some information earlier in the call, and/or an IoT device already supplied data, the agent may skip questions that had already been thus answered. For instance, an automatic crash notification might already provide information such as a location, number of passengers, and/or the like, so the agent may refrain from wasting time on re-asking about those. On the other hand, and as needed, the agent may confirm critical details to ensure accuracy, for example, the agent may ask "Let me confirm, the fire is in the kitchen on the second floor, correct?", and/or the like.

By the end of the interrogation and/or data intake conducted according to the selected response protocol, the virtual agent may have collected all essential details on the event for dispatching the call. The agent may use these details to determine a standardized incident code and/or classification, similarly as a human dispatcher would. For example, in a medical call using ProQA logic, the agent may assign to the incident a code like "10-D-1—Chest Pain" based on the answers received. This determinant code may be obtained as an outcome of the followed decision tree branching, representing the type and severity of the incident.

In some embodiments, the response protocol driven agent may be configured at this stage, with the emergency event fully classified (i.e., type, priority, etc.) and all key information gathered (i.e., most relevant event attributes, such as location, casualties, etc.), to provide any necessary immediate instructions to the caller (i.e., pre-arrival instructions), and/or finalize data entry in the emergency incident record for usage in CAD report context, i.e., by assigning proper incident codes for submission to the CAD service (available via the agentic functional tools). The agent may act in this capacity similarly to how a human call taker would in the process of handling an emergency call, by both helping the caller in the meantime and preparing responders prior to arrival at the scene.

Optionally, pre-arrival instructions may be retrievable by the agent as one of member functions in the agentic functional toolbox that may be used as the need arises, i.e., if the situation calls for it, the agent may give the caller guided instructions to help handle and/or mitigate the emergency until responders arrive at the scene. For medical emergencies, the instructions may include life-saving directions, such as for example, how to perform on a person cardiopulmonary resuscitation (CPR), how to place a tourniquet to stop a wound from bleeding, and/or the like. These instructions may generally be drawn from the same response protocol script and may be tailored to the incident (for example, if the protocol code determined is of cardiac arrest, the agent may immediately start CPR coaching). The agent may deliver instructions in various output modalities, e.g., via text-to-speech and/or voice-to-voice for voice calls, as text messages in a text session, and/or the like. The delivery of pre-arrival instructions by the agent may essentially mirror procedures such as in the "Dispatch Life Support" phase of a 911 call and/or the like, aimed at ensuring that the caller may be doing what they can to mitigate the situation. The response protocol driven agent may be configured with a capability to guide dispatchers and/or callers through the proper post-dispatch and pre-arrival steps, in a well-organized manner based on the appropriate response protocols.

The agent may be configured to, concurrently with the delivery of pre-arrival instructions and/or alternatively to it, perform incident coding and/or verification, i.e., by confirming the final incident code or set of codes that describe the emergency. This code (or protocol determinant) may dictate the level of response. The agent may assign the code based on the decision tree outcome at the end of the interrogation on the event details (e.g., a specific medical determinant code, a police incident type code, and/or the like). If not already captured, the agent may now ensure the incident location is verified (for example, the agent may prompt "Is the address X?," particularly in cases where the location was obtained from using location services and/or the like, e.g., information received via an IoT call, Global Positioning System (GPS) coordinates provided by the caller's phone, and/or the like).

With the caller either receiving help instructions or passed into a holding pattern (for less urgent situations) and the incident fully coded, the agent may now hand off the finalized incident data to the CAD service and initiate the dispatch process. Essentially, the call-taking phase may be complete, and the dispatch phase may begin.

The agent may provide the incident information for dispatching the call in the form of a CAD incident report, which the agent may submit to the CAD service using the CAD functional tool. The CAD function may take the structured incident data compiled by the response protocol driven agent and interact with an interface of the CAD service for entering it into a database thereof for processing and dispatch. The CAD service may be available as an integrated dispatch platform within the architecture 300, as an external system or group of systems, and/or combination of both. Optionally the function of submitting and entering the CAD incident report may be performed for most if not all emergency events for call logging and data analysis purposes.

The CAD incident report creation may be carried out automatically, and optionally concurrently during the call taking and interrogation phase by the virtual agent. The agent may populate an emergency incident record in CAD with all relevant details, for example, the incident type and/or code, priority level, caller information, and other relevant data from the questions-and-answers interaction flow, e.g., summaries of event occurrences, number of injured persons, descriptions of perpetrators, and/or the like. The process may resemble how a call-taker may type all the information into the CAD notes and/or record entries, but the agent may operate instantly and automatically. Optionally the agent may leverage AI capabilities for predictive pre-population suggestions of unfilled entries based on information previously or currently being fed.

At this stage, the agent may optionally also perform location integration, i.e., the location of the incident may be confirmed and mapped by the agent, using location services, where applicable. For example, if the call came from a client device such as a phone, the agent may use location resources and/or services such as for example, on-device GPS sensory data, ANI/ALI, and/or the like. Additionally or alternatively, if an address was provided by the caller and/or an IoT source it may be directly fed into the CAD entry.

Further at this stage, the agent may optionally also perform data enrichment, and attach any additional information obtained throughout the processing and handling of the call, from the moment it had been initially received at the autonomous PSAP architecture 300 and until the end of the decision tree of the selected response protocol had been reached. For example, IoT and/or sensor data received from a client device, such as for example, telemetry from a vehicle, medical information like allergies from a wearable device and/or a caller's emergency health profile, alarm sensor readings, and/or the like, may be added to the CAD notes.

At this point, the CAD service may be provided with a comprehensive record of the emergency event, i.e., what it is, where it is, who is involved (as far as known), and any special circumstances. The incident may now be ready for resource dispatch.

After providing the CAD service with the entire incident information in structured CAD report format, the agent may turn to finalizing the incident, following responder confirmation and/or call termination. Typically, the emergency call with the caller may end when responders arrive at the scene, and/or the immediate crisis passes. The field responders may notify the CAD service that they have arrived on scene, and/or later when the incident is under control. The CAD service may intake those status updates automatically and optionally also relay the data to one or more other components of the architecture 300, such as the virtual agents 400, for logging and analysis (e.g., performance assessment, insights, future optimizations, etc.). When responders indicate the incident is resolved, the CAD service may mark the call as closed. The CAD record created by the agent may be finalized accordingly. Once closed, the incident may be essentially archived. The virtual agents 400 may be initiated by the AI logic 312 to handle new incoming emergencies, and the cycle may begin anew with each subsequent call. The end-to-end loop—from intake to closure—may now be complete for that incident.

Referring now back to FIG. 3, the exemplary autonomous PSAP architecture 300 may further include one or more protective mechanisms to ensure proper functioning and interaction flow between the virtual agents 400 and callers and allow for human intervention when necessary. These mechanism(s) may include a guardrails 314 functional module and/or a live monitoring agent 316 in communication with a human supervisor 318 dashboard and/or intervention console, as shown in FIG. 3. The guardrails 314 and/or monitoring agent 316 may oversee the handling of the call by the AI logic 312 and/or its virtual agents 400 and provide indications and/or alerts to the human supervisor 318 as needed, e.g., based on qualitative and/or quantitative measurements performed, upon triggering conditions being met, and/or the like. The human supervisor 318 post may be staffed by a PSAP operator, e.g., a call taker, a manager, a supervisor, and/or the like. The role of the guardrails 314 and/or monitoring agent 316 may serve as a safety net for the agent-driven operations, much like the role that a human supervisor would play in a center staffed by human call-takers. The guardrails 314 and/or monitoring agent 316 may continuously monitor the ongoing call and/or incident creation process for any anomalies and/or situations that fall outside the virtual agents' prescribed confidence levels and/or capability.

The monitoring agent 316 may be configured to perform quality and/or confidence monitoring with regard to operations of the AI logic 312 and/or its virtual agents 400. The monitoring agent 316 may continuously track a level of confidence assigned by the agent to the information extraction process and/or its outcome at each step of the interaction with the caller and/or IoT device. If, for example, speech recognition yielded uncertain results or the caller's responses did not match any expected pattern, the monitoring agent 316 may flag this and alert the human supervisor 318 accordingly. As another example, the monitoring agent 316 may detect that the conversation between the agent and caller may be going in circles and/or that the agent may otherwise be unable to get required information after a certain number of attempts.

The guardrails 314 may be configured to detect unexpected and/or abnormal occurrences that call for escalation, e.g., according to predefined trigger conditions specified in its logic. For instance, if the caller mentions something that may not be properly addressed by the selected response protocol, or if the situation suddenly worsens beyond a critical point (e.g., the caller says "he's stopped breathing now" unexpectedly), the guardrails 314 may recognize that the circumstances call for human attention and/or other drastic measures in response. Other triggers may include, for example, certain keywords that indicate a high-liability scenario (e.g. "hostage," "active shooter", etc.) where a human operator should take over, poor quality of performance and/or communication, e.g., the agent's questions not yielding clear answers and/or the caller asking to repeat too often (indicating potential confusion), and/or the like.

The intervention mechanism in response to issues detected by the guardrails 314 and/or monitoring agent 316 may optionally include automated measures and/or call to intervention by a human entity, whether passively or actively. For example, when the guardrails 314 and/or monitoring agent 316 detect an issue, the AI logic 312 may be triggered to automatically adjust the agent's operation, e.g., load a different response protocol and/or the like. Additionally or alternatively, the AI logic 312, guardrails 314 and/or monitoring agent 316 may call for human help, e.g., by pinging the human supervisor 318 to take over by its human operator. In other instances, the human operator may be silently alerted via the human supervisor 318 terminal to listen in on the call in parallel and be ready to take over if and when needed. In some cases, the human operator at the human supervisor 318 interface may simply provide instructions behind the scenes to the AI logic 312, like a human supervisor whispering in the car of a human call-taker to provide coaching, guidance, or additional knowledge or information.

In practice, this presence of protective mechanisms such as the guardrails 314 and/or monitoring agent 316 means that the AI logic 312 may be backed up by a constant check that may revert to human control if needed. When the guardrails 314 and/or the monitoring agent 316 detect that a trigger condition is met and/or other unexpected or abnormal situation occurs, it may lead to alerting and/or involvement from a human supervisor and/or call-taker. Even if no trigger occurs, the monitored information may still be fed to the supervisory interface at the human supervisor 318 terminal for oversight. Thus, the flow may either continue autonomously or be elevated to the human supervisor 318 dashboard for human review.

The human supervisor 318 dashboard and intervention console may be configured to serve as a human facing interface for oversight and manual control. The human supervisor 318 interface may allow experienced human personnel (e.g., PSAP operators and/or supervisors) to oversee all ongoing calls and dispatches in real time. For example, the human supervisor 318 interface may provide for live monitoring of calls, where supervisors can observe at a glance the status of each incident being handled by the AI logic 312 and/or its virtual agents 400—including transcripts of the conversation so far, the questions asked, answers given, the current determinant code and/or progress in the protocol, etc. The human supervisor 318 interface may present human operators with the incident information much like as if they were looking in a human call-taker's screen display as silent observers. The human supervisor 318 interface may allow human operators to eavesdrop and/or barge into ongoing voice calls, if and when needed. Additionally or alternatively, as described herein, the human supervisor 318 interface may be used for purposes such as alerts and escalation of response, e.g., when a call is flagged by the guardrails 314 and/or monitoring agent 316. For example, alerts generated and outputted via the human supervisor 318 interface may include notices such as "Agent needs help: cannot verify address", "High-priority incident—supervision recommended", and/or the like. The human operator at the human supervisor 318 terminal can then choose whether to intervene. Additionally, at the human supervisor 318 interface may include manual take-over controls, for example, at any time, a human operator may select a call and assume control over it from the virtual agent, speaking directly to the caller and/or taking over the textual chat, effectively pausing or shutting off the agent for that call.

Human intervention via the human supervisor 318 interface may take various forms, for example, when intervening, the human operator may clarify information with the caller, make a judgement call on an unusual situation, and/or the like. Optionally whenever humans step in, their actions and/or input are logged in and stored in the incident record.

The human supervisor 318 dashboard may enable humans to remain in the loop for oversight and provide transparency into the decisions and operations of the AI logic 312 and its agents 400, as well as a mechanism for escalation whenever necessary.

The autonomous PSAP in accordance with the disclosed subject matter and human supervisors operating it form a hybrid model where the AI logic 312 does the heavy lifting of routine calls and quick decisions, while humans manage exceptional cases and overall health and performance benchmarks.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant artificial intelligence (AI), large language models (LLMs), and/or Retrieval-Augmented Generation (RAG) tools and/or techniques will be developed and the scope of these terms is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for autonomous public safety answering point (PSAP), comprising:
    at least one processing circuitry adapted for:
        receiving at least one emergency call originating from at least one client device used to report at least one emergency event;
        initiating at least one artificial intelligence (AI) agent for handling the at least one emergency call, configured for:
            classifying the at least one emergency event into one of a plurality of event types associated with a plurality of response protocols according to data extracted from the at least one emergency call;
            initiating at least one emergency event report interaction via the at least one client device for prompting at least one reply to at least one query relating to the at least one emergency event, driven each by a respective one of the plurality of response protocols according to classification of a respective one of the at least one emergency event;
            determining at least one event attribute of the at least one emergency event according to data extracted from the at least one reply received to the at least one query;
            populating at least one entry of at least one emergency event record for computer aided dispatch (CAD) of responder units to emergency events according to the at least one event attribute; and
            responsive to a determination to dispatch at least one responder unit to address the at least one emergency event, dispatching the at least one responder unit according to the at least one emergency event record.

2. The apparatus of claim 1, wherein the at least one AI agent comprises at least one voice agent.

3. The apparatus of claim 2, wherein the at least one voice agent uses speech-to-text and/or text-to-speech conversion.

4. The apparatus of claim 1, wherein the at least one AI agent is configured for processing multi-modal input comprising at least one member selected from the group consisting of: text; imagery; audio; and video.

5. The apparatus of claim 1, wherein the at least one AI agent is further configured for filtering out non-emergencies and/or misrouted calls according to results of the classifying.

6. The apparatus of claim 1, wherein the at least one AI agent is further configured for determining a priority level of the at least one emergency event when performing the classifying and/or the at least one emergency event report interaction.

7. The apparatus of claim 6, wherein the at least one AI agent is further adapted for adjusting the priority level of the at least one emergency according to the at least one reply and/or data obtained during the at least one emergency event report interaction.

8. The apparatus of claim 1, wherein the at least one AI agent is further configured for providing to at least one user of the at least one client device at least one pre-arrival instruction retrieved according to information populated at the at least one entry of the at least one emergency event record.

9. The apparatus of claim 1, wherein the at least one AI agent is further configured for interfacing at least one resource selected from the group consisting of: advanced mobile location (AML) service; automatic number identification (ANI) service; automatic location identification (ALI) service; public safety communication platform; response protocols knowledge base; CAD service; electronic health record (EHR) database; emergency contacts database; sensor data; and internet-of-things (IoT) data.

10. The apparatus of claim 9, wherein the at least one AI agent is further configured for determining location of the at least one client device according to data retrieved from the AML service, and using the location for populating at least one another entry of the at least one emergency event record.

11. The apparatus of claim 10, wherein the at least one AI agent is further configured for using the location in the at least one emergency event report interaction to refine the at least one query, and populating the at least one another entry according to the at least one reply to the at least one query refined.

12. The apparatus of claim 1, wherein the at least one AI agent is further configured for receiving at least one status report provided by the at least one responder unit via at least one CAD interface, and updating the at least one emergency event record according to the at least one status report.

13. The apparatus of claim 1, wherein the at least one AI agent comprises:
at least one triage agent configured for performing the classifying, wherein the plurality of event types comprises at least one of a medical event, a fire event, and a police event; and
at least one member selected from the group consisting of a medical agent, a fire agent, and a police agent configured for performing the at least one emergency event report interaction, determining the at least one event attribute, populating the at least one entry, and dispatching the at least one responder unit.

14. The apparatus of claim 1, wherein the at least one processing circuitry is further adapted for monitoring the at least one emergency event report interaction and generating an alert responsive to detection of anomaly or trigger condition.

15. The apparatus of claim 14, wherein the at least one processing circuitry is further adapted for routing a respective one of the at least one emergency call to a human operator responsive to the detection.

16. The apparatus of claim 1, wherein each of the at least one emergency call is initiated by a user or an automated device.

17. The apparatus of claim 1, wherein the at least one AI agent uses at least one large language model (LLM) for providing output and/or processing input.

18. The apparatus of claim 17, wherein the at least one LLM is enhanced with retrieval-augmented generation (RAG).

19. A computer program product comprising:
a non-transitory computer readable storage medium;
program instructions for executing, by a processor, a method for providing autonomous public safety answering point (PSAP), the method comprising:
receiving at least one emergency call originating from at least one client device used to report at least one emergency event;
initiating at least one artificial intelligence (AI) agent for handling the at least one emergency call, configured for:
classifying the at least one emergency event into one of a plurality of event types associated with a plurality of response protocols according to data extracted from the at least one emergency call;
initiating at least one emergency event report interaction via the at least one client device for prompting at least one reply to at least one query relating to the at least one emergency event, driven each by a respective one of the plurality of response protocols according to classification of a respective one of the at least one emergency event;
determining at least one event attribute of the at least one emergency event according to data extracted from the at least one reply received to the at least one query;
populating at least one entry of at least one emergency event record for computer aided dispatch (CAD) of responder units to emergency events according to the at least one event attribute; and
responsive to a determination to dispatch at least one responder unit to address the at least one emergency event, dispatching the at least one responder unit according to the at least one emergency event record.

20. A method of providing autonomous public safety answering point (PSAP), comprising:
receiving at least one emergency call originating from at least one client device used to report at least one emergency event;
initiating at least one artificial intelligence (AI) agent for handling the at least one emergency call, configured for:
classifying the at least one emergency event into one of a plurality of event types associated with a plurality of response protocols according to data extracted from the at least one emergency call;
initiating at least one emergency event report interaction via the at least one client device for prompting at least one reply to at least one query relating to the at least one emergency event, driven each by a respective one of the plurality of response protocols according to classification of a respective one of the at least one emergency event;
determining at least one event attribute of the at least one emergency event according to data extracted from the at least one reply received to the at least one query;

populating at least one entry of at least one emergency event record for computer aided dispatch (CAD) of responder units to emergency events according to the at least one event attribute; and responsive to a determination to dispatch at least one responder unit to address the at least one emergency event, dispatching the at least one responder unit according to the at least one emergency event record.

\* \* \* \* \*